(12) United States Patent
Ikeda et al.

(10) Patent No.: US 6,970,324 B2
(45) Date of Patent: Nov. 29, 2005

(54) THIN FILM HEAD WITH NICKEL-IRON ALLOY NON-MAGNETIC SUBSTRATUM BETWEEN NON-MAGNETIC GAP LAYER AND UPPER MAGNETIC POLE LAYER

(75) Inventors: Shoji Ikeda, Kawasaki (JP); Takayuki Kubomiya, Kawasaki (JP); Ikuya Tagawa, Kawasaki (JP); Yuji Uehara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 311 days.

(21) Appl. No.: 10/299,177

(22) Filed: Nov. 19, 2002

(65) Prior Publication Data

US 2003/0147183 A1 Aug. 7, 2003

(30) Foreign Application Priority Data

Feb. 4, 2002 (JP) .............................. 2002-026404

(51) Int. Cl.[7] .............................................. G11B 5/31
(52) U.S. Cl. ..................................................... 360/126
(58) Field of Search .............................. 360/126, 317, 360/318

(56) References Cited

U.S. PATENT DOCUMENTS

| | | | |
|---|---|---|---|
| 6,120,918 A | 9/2000 | Osaka et al. | 428/692 |
| 6,600,637 B1 * | 7/2003 | Johnson et al. | 360/324 |
| 6,687,098 B1 * | 2/2004 | Huai | 360/324.12 |
| 6,697,219 B1 * | 2/2004 | Sato | 360/126 |
| 2002/0080523 A1 * | 6/2002 | Sato et al. | 360/126 |
| 2002/0105757 A1 * | 8/2002 | Oki et al. | 360/126 |

FOREIGN PATENT DOCUMENTS

| | | |
|---|---|---|
| JP | 9-115729 | 5/1997 |
| JP | 10-270246 | 10/1998 |
| JP | 11-74122 | 3/1999 |
| JP | 11-121232 | 4/1999 |

OTHER PUBLICATIONS

N.X. Sun et al.; "Soft High Saturation Magnetization $(Fe_{0.7}Co_{0.3})_{1-x}N_x$ Thin Films for Inductive Write Heads"; *IEEE Transactions on Magnetics*; vol. 36, No. 5; Sep. 2000, pp. 2506-2508.

* cited by examiner

*Primary Examiner*—Craig A. Renner
(74) *Attorney, Agent, or Firm*—Greer, Burns & Crain, Ltd.

(57) ABSTRACT

A soft magnetic film includes a ferromagnetic layer. The ferromagnetic layer is laid over a non-magnetic substructure including ferromagnetic atoms. The uniaxial magnetic anisotropy may be established in the ferromagnetic layer. Since a magnetic property is not required in the substructure under the ferromagnetic layer, the soft magnetic film of this type may be utilized for purposes of wider variations.

9 Claims, 9 Drawing Sheets

THIN FILM HEAD WITH NICKEL-IRON ALLOY NON-MAGNETIC SUBSTRATUM BETWEEN NON-MAGNETIC GAP LAYER AND UPPER MAGNETIC POLE LAYER

BACKGROUND OF THE INVENTION

1. Field of the Invention

The present invention relates to a soft magnetic film, and in particular to a soft magnetic film mainly utilized in a magnetic pole for a thin film magnetic head.

In this specification, the content of an element in alloy is determined based on the atomic percentage.

2. Description of the Prior Art

For example, an iron cobalt nitrogen (FeCoN) alloy layer is well known. The FeCoN alloy layer realizes a relatively higher saturation magnetic flux density such as 2.4 [T] approximately. In addition, if the FeCoN alloy layer is laid over the nickel iron (NiFe) ferromagnetic layer, a good magnetic anisotropy can be obtained in the FeCoN alloy layer. See IEEE Transactions on Magnetics, Vol. 36, No. 5, September 2000, pp2506–2508, for example. The FeCoN alloy layer on the NiFe ferromagnetic layer exhibits a soft higher saturation magnetization.

A still higher saturation magnetization is required for the upper and lower magnetic poles in a thin film magnetic or inductive write head utilized to write bit data in a hard disk drive (HDD), for example. A higher saturation magnetization leads to generation of a stronger magnetic field for recording at the write gap of the thin film magnetic head. A stronger magnetic field for recording largely contributes to a still increased recording density. A higher saturation magnetization is expected in a soft magnetic film.

For example, the aforementioned FeCoN alloy layer may be utilized as the upper magnetic pole of the thin film magnetic head. However, the aforementioned FeCoN alloy layer should be accompanied by a substratum of the NiFe ferromagnetic layer for establishment of a predetermined magnetic anisotropy. Accordingly, the NiFe ferromagnetic layer has to be interposed between the upper magnetic pole and the non-magnetic spacer or gap layer. Since the NiFe ferromagnetic layer only exhibits the saturation magnetization of 1.1 [T] approximately, the utilization of the FeCoN alloy layer fails to lead to establishment of a stronger magnetic field for recording.

SUMMARY OF THE INVENTION

It is accordingly an object of the present invention to provide a soft magnetic film greatly contributing to establishment of a stronger magnetic field for recording in a thin film magnetic head.

According to the present invention, there is provided a soft magnetic film comprising: a ferromagnetic layer laid over a non-magnetic substructure including ferromagnetic atoms.

When the ferromagnetic layer is formed to extend over the non-magnetic substructure including ferromagnetic atoms, the uniaxial magnetic anisotropy is established in the ferromagnetic layer. The soft magnetic property can be established in the ferromagnetic layer. In addition, a magnetic property is not required in the substructure under the ferromagnetic layer. The soft magnetic film of this type may be utilized for purposes of wider variations.

The ferromagnetic atoms in the non-magnetic substructure may belong to at least an element selected from a group consisting of Fe, Ni and Co. The non-magnetic substructure may be made of NiFe alloy. The non-magnetic substructure may further contain at least an atom belonging to an element selected from a group consisting of Al, Y, Ti, Zr, Hf, V, Nb, Ta, Cr, Mo W, Rh, Ru, Pd and Pt. For example, if the Cr atoms are contained in the NiFe alloy at content equal to or larger than 25 at %, the complete non-magnetic property can be obtained in the NiFe alloy.

The ferromagnetic layer may be made of alloy containing an atom belonging to at least an element selected from a group consisting of Fe and Co. The alloy may be iron cobalt (FeCo) alloy. The alloy of this type is allowed to exhibit a higher saturation magnetic flux density. The iron cobalt alloy may contain at least an atom belonging to an element selected from a group consisting of O, N and C. In addition, the iron cobalt alloy may further contain at least an atom belonging to an element selected from a group consisting of Al, B, Ga, Si, Ge, Y, Ti, Zr, Hf, V, Nb, Ta, Cr, Ni, Mo, W, Rh, Ru, Pd and Pt.

The soft magnetic film of the aforementioned type may be utilized as a magnetic pole of a thin film magnetic head. The thin film magnetic head is in general used to write bit data into a magnetic recording medium in a magnetic recording medium drive such as a hard disk drive (HDD). The thin film magnetic head may include: a lower magnetic pole; a non-magnetic layer laid over the lower magnetic pole; a non-magnetic substratum laid over the non-magnetic layer and containing ferromagnetic atoms; and an upper magnetic pole laid over the non-magnetic substratum and containing ferromagnetic atoms. The soft magnetic layer of the aforementioned type may be utilized as the upper magnetic pole laid over the non-magnetic substratum. The thin film magnetic head may be mounted on a head slider incorporated within the HDD, for example.

BRIEF DESCRIPTION OF THE DRAWINGS

The above and other objects, features and advantages of the present invention will become apparent from the following description of the preferred embodiment in conjunction with the accompanying drawings, wherein.

DESCRIPTION OF THE PREFERRED EMBODIMENT

Figure 1:
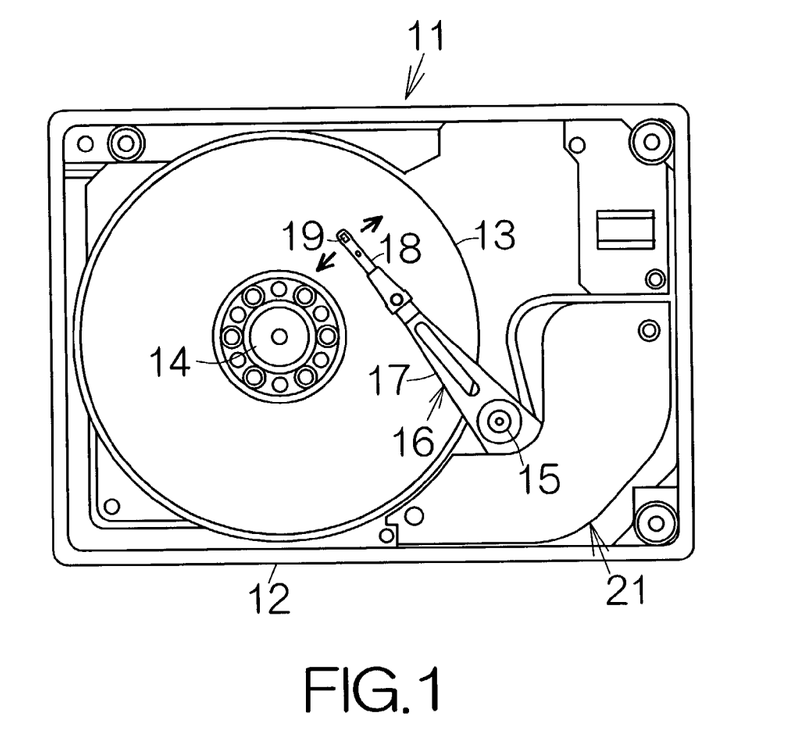
FIG. 1 is a plan view schematically illustrating the structure of a hard disk drive (HDD)

FIG. 1 schematically illustrates the inner structure of a hard disk drive (HDD) 11 as an example of a recording medium drive or storage device. The HDD 11 includes a box-shaped primary enclosure 12 defining an inner space of a flat parallelepiped, for example. At least one magnetic recording disk 13 is accommodated in the inner space within the primary enclosure 12. The magnetic recording disk 13 is mounted on the driving shaft of a spindle motor 14. The spindle motor 14 is allowed to drive the magnetic recording disk 13 for rotation at a higher revolution speed such as 7,200 rpm or 10,000 rpm, for example. A cover, not shown, is coupled to the primary enclosure 12 so as to define the closed inner space between the primary enclosure 12 and itself.

A carriage 16 is also accommodated in the inner space of the primary enclosure 12. The carriage 16 is designed to swing about a vertical support shaft 15. The carriage 16 includes a rigid swinging arm 17 extending in the horizontal direction from the vertical support shaft 15, and an elastic head suspension 18 fixed to the tip end of the swinging arm 17. The elastic head suspension 18 extends forward from the swinging arm 17. As conventionally known, a flying head slider 19 is cantilevered at the head suspension 18 through a gimbal spring, not shown. The head suspension 18 serves to urge the flying head slider 19 toward the surface of the magnetic recording disk 13. When the magnetic recording disk 13 rotates, the flying head slider 19 is allowed to receive airflow generated along the rotating magnetic recording disk 13. The airflow serves to generate a lift on the flying head slider 19. The flying head slider 19 is thus allowed to keep flying above the surface of the magnetic recording disk 13 during rotation of the magnetic recording disk 13 at a higher stability established by the balance between the lift and the urging force of the head suspension 18.

When the carriage 16 is driven to swing about the support shaft 15 during the flight of the flying head slider 19, the flying head slider 19 is allowed to cross the recording tracks defined on the magnetic recording disk 13 in the radial direction of the magnetic recording disk 13. This radial movement serves to position the flying head slider 19 right above a target recording track on the magnetic recording disk 13. In this case, an electromagnetic actuator 21 such as a voice coil motor (VCM) can be employed to realize the swinging movement of the carriage 16, for example. As conventionally known, in the case where two or more magnetic recording disks 13 are incorporated within the inner space of the primary enclosure 12, a pair of the elastic head suspensions 18 and the swinging arms 17 are disposed between the adjacent magnetic recording disks 13.

Figure 2:
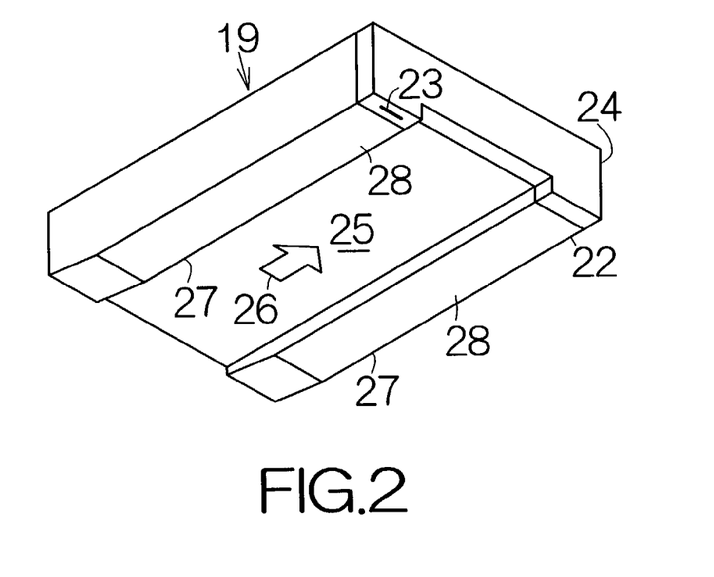
FIG. 2 is an enlarged perspective view of a flying head slider according to a specific example.

FIG. 2 illustrates a specific example of the flying head slider 19. The flying head slider 19 of this type includes a slider body 22 made of $Al_2O_3$—TiC in the form of a flat parallelepiped, and a head protection layer 24 coupled to the trailing or outflow end of the slider body 22. The head protection layer 24 may be made of $Al_2O_3$. A read/write electromagnetic transducer 23 is embedded in the head protection layer 24. A medium-opposed surface or bottom surface 25 is defined continuously over the slider body 22 and the head protection layer 24 so as to face the surface of the magnetic recording disk 13 at a distance. The bottom surface 25 is designed to receive airflow 26 generated along the surface of the rotating magnetic recording disk 13.

A pair of rails 27 are formed to extend over the bottom surface 25 from the leading or inflow end toward the trailing or outflow end. The individual rail 27 is designed to define an air bearing surface 28 at its top surface. In particular, the airflow 26 generates the aforementioned lift at the respective air bearing surfaces 28. The read/write electromagnetic transducer 23 embedded in the head protection layer 24 is designed to expose the front end at the air bearing surface 28 as described later in detail. A diamond-like-carbon (DLC) protection layer may additionally be formed to extend over the air bearing surface 28 to cover over the front end of the read/write electromagnetic transducer 23. The flying head slider 19 may take any shape or form other than the above-described one.

Figure 3:
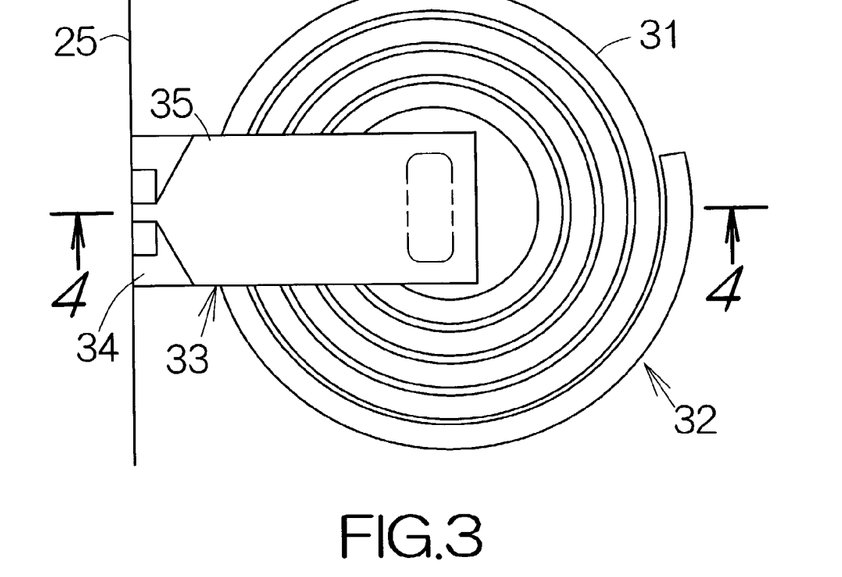
FIG. 3 is an enlarged plan view schematically illustrating the structure of a thin film magnetic or inductive write head according to the present invention.

As shown in FIG. 3 in detail, the read/write electromagnetic transducer 23 includes a thin film magnetic or inductive write head 32 according to an embodiment of the present invention. The thin film magnetic head 32 is designed to utilize a magnetic field induced at a conductive swirly coil pattern 31 so as to record magnetic binary data in to the magnetic recording disk 13. When a magnetic field is induced at the swirly coil pattern 31 in response to supply of an electric current, a magnetic flux is allowed to circulate through a magnetic core 33 penetrating through the swirly coil pattern 31 at its central position. The swirly coil pattern 31 may be made from a conductive metallic material such as Cu, for example.

Figure 4:
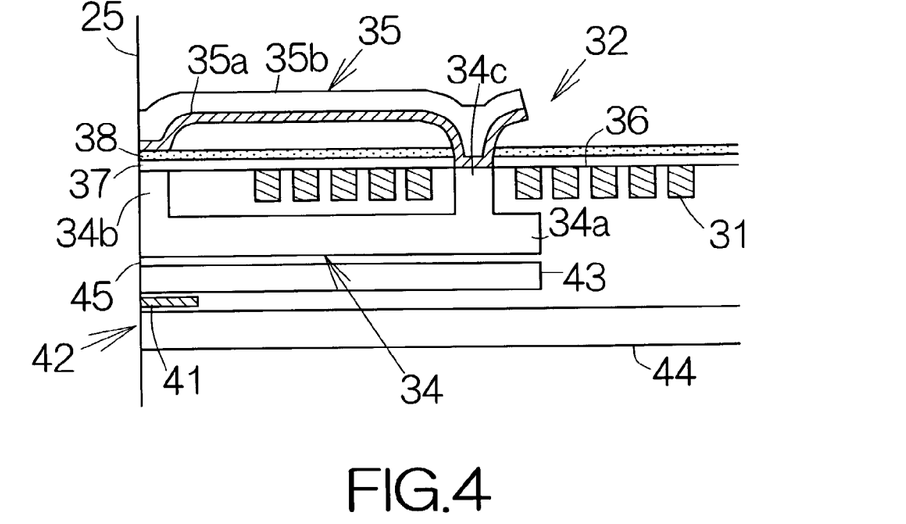
FIG. 4 is a sectional view taken along the line 4—4 in FIG. 3.

Referring also to FIG. 4, the magnetic core 33 includes lower and upper magnetic poles 34, 35 extending forward from the central position of the swirly coil pattern 31 toward the bottom surface 25. The front ends of the lower and upper magnetic poles 34, 35 get exposed at the air bearing surface 28. The lower magnetic pole 34 includes a primary magnetic pole layer 34a and a front magnetic pole piece 34b standing on the upper surface of the primary magnetic pole layer 34a outside the swirly coil pattern 31. The front magnetic pole piece 34b is disposed adjacent the air bearing surface 28. The lower magnetic pole 34 further includes a rear magnetic pole piece 34c standing on the upper surface of the primary magnetic pole layer 34a at the central position of the swirly coil pattern 31. The top surfaces of the front and rear magnetic pole pieces 34b, 34c are positioned within a flat surface 36. The lower magnetic pole 34 may be made of NiFe, for example.

A non-magnetic layer 37 is laid over the lower magnetic pole 34 so as to extend on the flat surface 36. The non-magnetic layer 37 is designed to extend rearward from the front end exposed at the air bearing surface 28. A non-magnetic substratum or substructure 38 is laid over the non-magnetic layer 37. The non-magnetic substratum 38 contains ferromagnetic atoms. The front end of the upper magnetic pole 35 is received on the upper surface of the non-magnetic substratum 38. The non-magnetic substratum 38 is in this manner interposed between the lower and upper magnetic poles 34, 35 along with the non-magnetic layer 37. A write gap is thus defined between the lower and upper magnetic poles 34, 35. It should be noted that the non-magnetic substratum 38 may solely be interposed between the lower and upper magnetic poles 34, 35.

The non-magnetic substratum 38 may be made of nickel iron (NiFe) alloy containing Cr at a content equal to or larger than 25 at %. Alternatively, the non-magnetic substratum 38 may be made of an alloy containing ferromagnetic atoms belonging to at least an element selected from a group consisting of Fe, Ni and Co. In the latter case, the alloy may further contain at least a non-magnetic atom belonging to an element selected from a group consisting of Al, Y, Ti, Zr, Hf, V, Nb, Ta, Cr, Mo, W, Rh, Ru, Pd and Pt. The non-magnetic atoms serves to establish the non-magnetic property of the alloy.

The upper magnetic pole 35 includes a ferromagnetic layer 35a laid over the non-magnetic substratum 38 and a primary magnetic pole layer 35b designed to extend forward from the central position of the swirly coil pattern 31. At least the front end of the primary magnetic pole layer 35b is received on the ferromagnetic layer 35a. The upper magnetic pole 35 is designed to oppose the ferromagnetic layer 35a to the lower magnetic pole 34. The rear end of the upper magnetic pole 35 is connected to the rear magnetic pole piece 34c of the lower magnetic pole 34 at the central position of the swirly coil pattern 31.

The ferromagnetic layer 35a may be made of iron cobalt (FeCo) alloy, for example. The FeCo alloy may further contain at least an atom belonging to an element selected from a group consisting of O, N and C. The FeCo alloy may still further contain at least an atom belonging to an element selected from a group consisting of Al, B, Ga, Si, Ge, Y, Ti, Zr, Hf, V, Nb, Ta, Cr, Ni, Mo, W, Rh, Ru, Pd and Pt. Alternatively, the ferromagnetic layer 35a may be made of an alloy containing ferromagnetic atoms belonging to at least an element selected from a group consisting of Fe and Co. The ferromagnetic layer 35a on the non-magnetic substratum 38 exhibits a soft magnetic property as well as a higher saturation magnetic flux density or saturation magnetization larger than 2.4[T] approximately as described later in detail. The primary magnetic pole layer 35b may be made of NiFe, for example.

As shown in FIG. 4, the read/write electromagnetic transducer 23 further includes a read head 42. The read head 42 is designed to utilize a magnetoresistive element 41 so as to discriminate magnetic bit data on the magnetic recording disk 13. As conventionally known, the magnetoresistive element 41 is interposed between upper and lower shield layers 43, 44. A read gap is defined between the upper and lower shield layers 43, 44. The upper and lower shield layers 43, 44 may be made of a magnetic material such as FeN, NiFe, or the like. The magnetoresistive element 41 maybe a giant magnetoresistive (GMR) element, a tunnel-junction magnetoresistive (TMR) element, or the like.

As is apparent from FIG. 4, a non-magnetic layer 45 of a constant thickness is interposed between the lower magnetic pole 34 of the thin film magnetic head 32 and the upper shield layer 43 of the read head 42 in the read/write electromagnetic transducer 23. The non-magnetic layer 45 serves to space the lower magnetic pole 34 from the upper shield layer 43. The non-magnetic layer may be made of $Al_2O_3$, for example. Otherwise, the lower magnetic pole 34 of the thin film magnetic head 32 may also function as the upper shield layer 43 of the read head 42.

When an electric current is supplied to the swirly coil pattern 31 in the thin film magnetic head 32, a magnetic field is induced at the swirly coil pattern 31. The magnetic flux is introduced to the upper and lower magnetic poles 34, 35 from the central position of the swirly coil pattern 31. The magnetic flux is exchanged between the upper and lower magnetic poles 34, 35. The non-magnetic layer 37 and the non-magnetic substratum 38 serve to allow the exchanged magnetic flux to get leaked from the air bearing surface 28. The leaked magnetic flux forms a magnetic field for recording at the bottom surface 25. The formed magnetic field is utilized to magnetize the magnetic recording disk 13 opposed to the bottom surface 25 in predetermined directions.

In particular, a higher saturation magnetic flux density can be obtained at the front end of the upper magnetic pole 35 in the thin film magnetic head 32. A stronger magnetic field for recording can accordingly be formed at the write gap of the thin film magnetic head 32. A stronger magnetic field for recording of the thin film magnetic head 32 enables utilization of a material having a higher coercivity for the magnetic recording disk 13. As a result, an increased number of recording tracks can be established for a unit area over the magnetic recording disk 13. The recording density can thus be improved.

Figure 5:
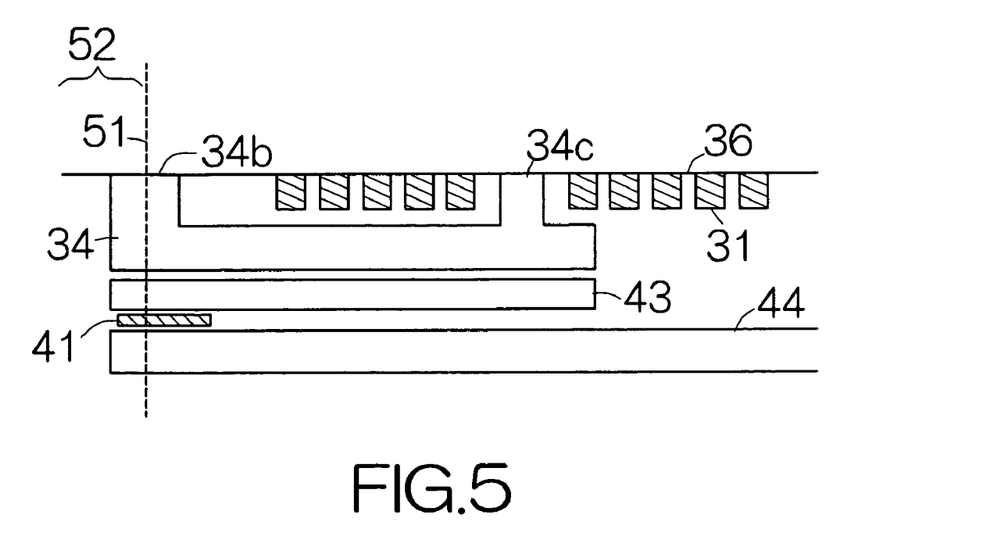
FIG. 5 is a partial sectional view of a wafer for schematically illustrating a method of making a lower magnetic pole and a swirly coil pattern.

Next, a brief description will be made on a method of making the thin film magnetic head 32. The upper and lower shield layers 43, 44 as well as the magnetoresistive element 41, embedded within an $Al_2O_3$ film interposed between the upper and lower shield layers 43, 44, for example, are formed on a wafer, not shown, made of $Al_2O_3$—TiC in a conventional manner. As shown in FIG. 5, the magnetoresistive element 41 is finally subjected to abrasion up to a datum plane 51. A marginal section 52 is removed based on the abrasion. The abrasion serves to allow the magnetoresistive element 41 to get exposed at the datum plane 51, namely, the air bearing surface 28.

Figure 6:
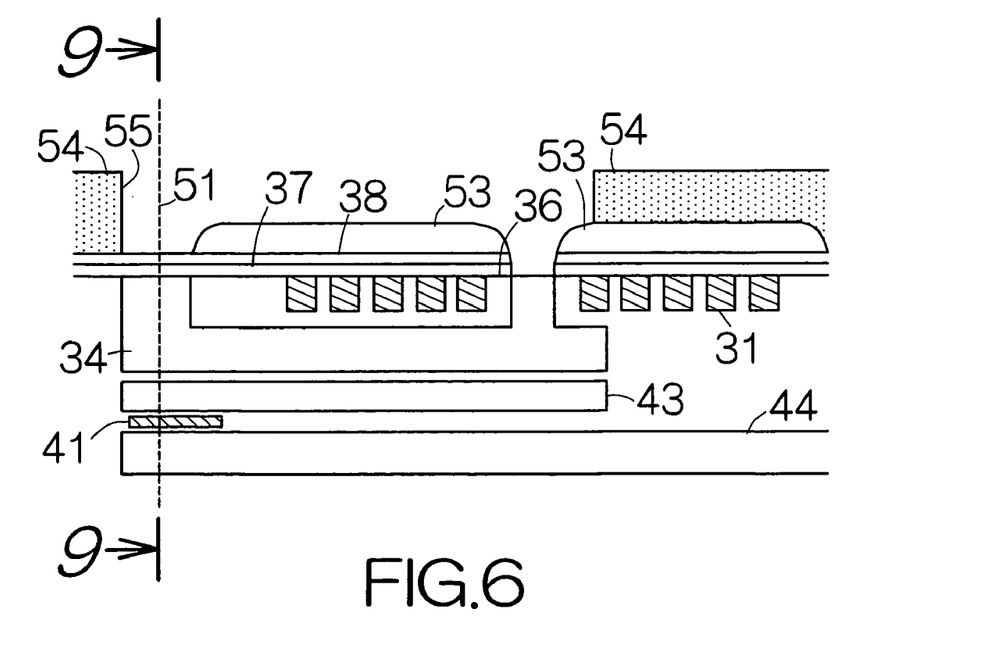
FIG. 6 is a partial sectional view of the wafer for schematically illustrating a photoresist film corresponding to the shape of an upper magnetic pole.

The lower magnetic pole 34 and the swirly coil pattern 31 are formed on the upper shield layer 43. A flattening polishing process may be employed to expose the top surfaces of the front and rear magnetic pole pieces 34b, 34c at the flat surface 36. The non-magnetic layer 37 and the non-magnetic substratum 38 are sequentially formed on the flat surface 36, as shown in FIG. 6, for example. Sputtering may be employed to form the non-magnetic layer 37 and the non-magnetic substratum 38. A swelling 53 of a non-magnetic material such as $Al_2O_3$ is then formed to extend over the non-magnetic substratum 38. A photoresist film 54 is thereafter formed to spread over the swelling 53 and the non-magnetic substratum 38. A void 55 is defined in the photoresist film 54. The void 55 is designed to correspond to the shape of the upper magnetic pole 35.

The ferromagnetic layer 35a is then formed within the void 55. Sputtering may be employed to deposit the ferromagnetic layer 35a. The target of the sputtering may comprise any alloy selected from FeCo, FeCoN, FeCoAlO, or other FeCo-based alloy, for example. Employment of a so-called revolving deposition serves to establish the easy axis of magnetization along the direction of the revolution in the ferromagnetic layer 35a deposited on the non-magnetic substratum 38.

Figure 7:
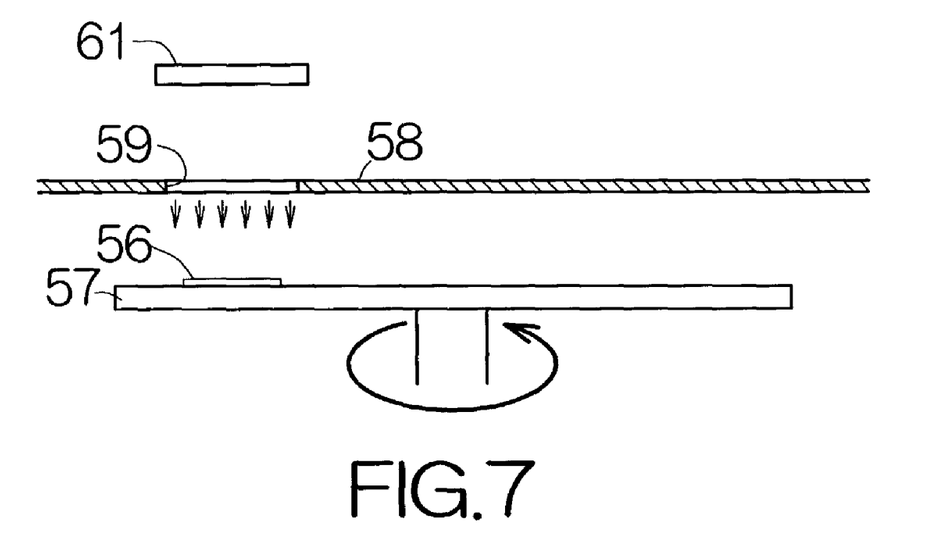
FIG. 7 is a schematic view illustrating a method of making a ferromagnetic layer on a non-magnetic substratum based on a so-called revolving deposition.

As shown in FIG. 7, when the revolving deposition is conducted, a wafer 56, namely, the non-magnetic substratum 38 is set on a rotary support 57, for example. When the rotary support 57 rotates, the non-magnetic substratum 38 is allowed to move along the circular orbit. As is apparent from FIG. 8, a through hole 59 defined in a shielding plate 58 serves to allow the particles or atoms to be sputtered out of the target 61 every time the non-magnetic substratum 38 passes right below the target 61. The particles or atoms are deposited on the non-magnetic substratum 38 as well as the swelling 53 within the void 55. The easy axis ES of magnetization is established along the direction of the movement in the ferromagnetic layer 35a on the non-magnetic substratum 38. A soft magnetic property is in this manner established in the ferromagnetic layer 35a on the non-magnetic substratum 38.

Figure 8:
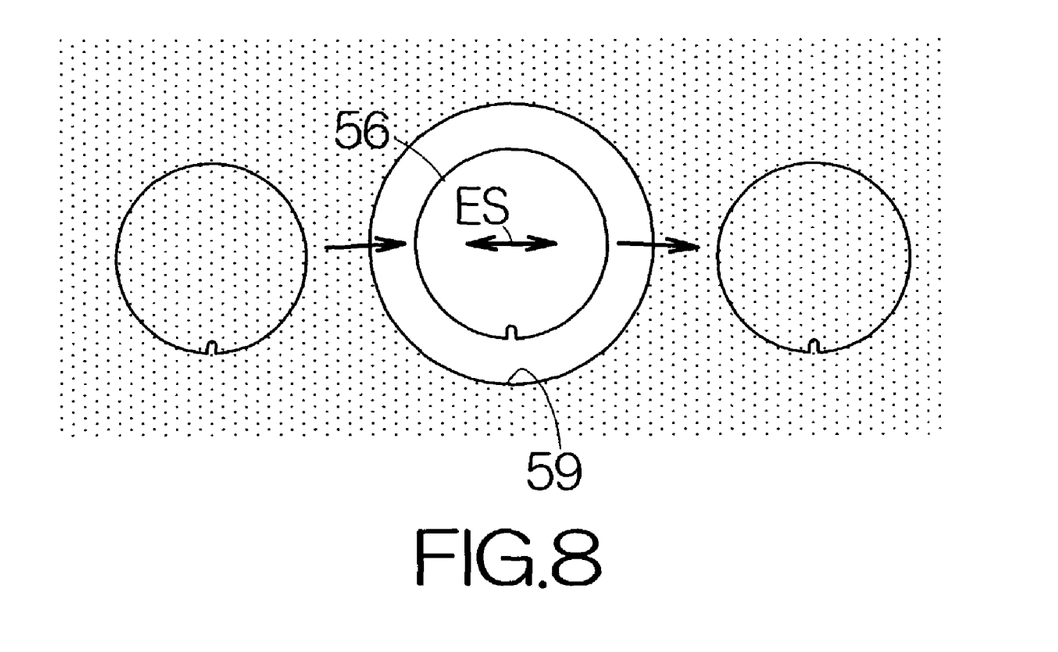
FIG. 8 is an enlarged plan view of the wafer for schematically illustrating the image of the magnetic anisotropy established based on the revolving deposition.

The primary magnetic pole layer 35b is formed on the ferromagnetic layer 35a within the void 55. Sputtering may be employed to form the primary magnetic pole layer 35b, for example. The upper magnetic pole 35 is thus formed to extend from the central position of the swirly coil pattern 31 to the datum plane 51 within the void 55.

Figure 9:
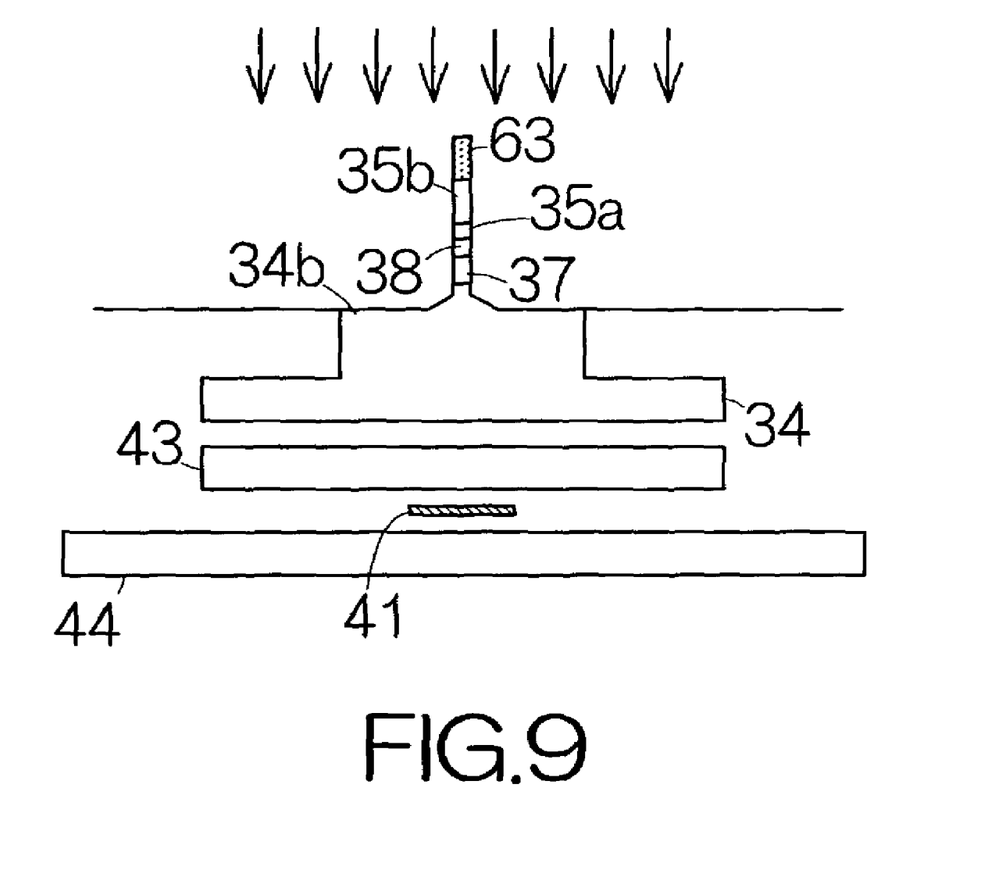
FIG. 9 is a view, corresponding to the sectional view taken along the line 9—9 in FIG. 6, for schematically illustrating a trimming process for the upper magnetic pole.

As shown in FIG. 9, a trimming process is then effected on the upper magnetic pole 35. The trimming process requires a photoresist film 63 formed on the upper magnetic pole 35. Ion milling, for example, is employed to engrave the upper magnetic pole 35a, 35b, the non-magnetic substratum 38, the non-magnetic layer 37 and the lower magnetic pole 34 in narrower forms. The thin film magnetic head 32 has been established on the wafer in the aforementioned manner. A non-magnetic film such as an $Al_2O_3$ film may finally be formed to cover over the thin film magnetic head 32. When the marginal section 52 is removed in the aforementioned manner, the formation of the thin film magnetic head 32 has been completed.

Figure 10:
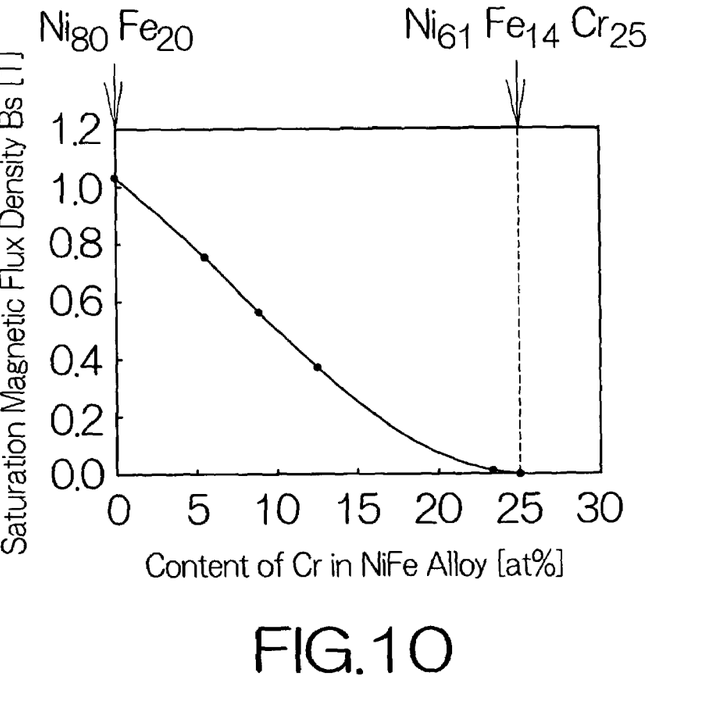
FIG. 10 is a graph illustrating the relationship between the content of Cr in NiFe alloy and the saturation magnetic flux density.

The inventors have observed the magnetic characteristic of the aforementioned ferromagnetic layer 35a. In the observation, the inventors have prepared the non-magnetic substratum or substructure based on NiFe alloy. Non-magnetic Cr atoms are added to the NiFe alloy so as to establish a non-magnetic property of the NiFe alloy. As shown in FIG. 10, it has been confirmed that the complete non-magnetic property appears in the NiFe alloy if the Cr atoms are added to the NiFe alloy at a content equal to or larger than 25 at %. A vibration sampling magnetometer (VSM) is employed to measure the saturation magnetic flux density $\underline{Bs}$. The NiFe alloy layer was placed within a magnetic field of 800 [kA/m].

Figure 11:
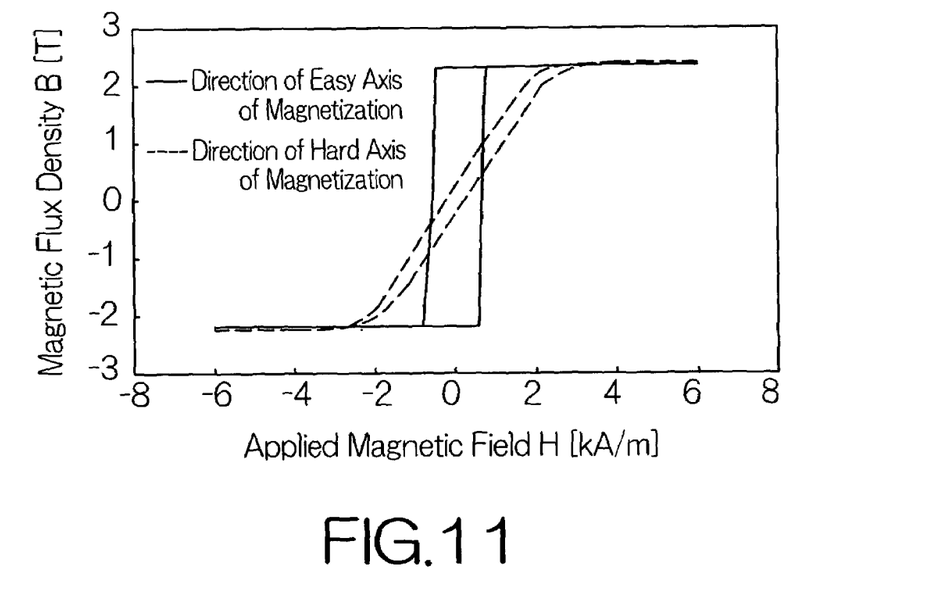
FIG. 11 is a graph illustrating the BH hysteresis of a ferromagnetic layer of FeCoAlO alloy or soft magnetic layer according to the present invention.

The inventors have also formed a ferromagnetic layer of $Fe_{68.6}Co_{29.4}Al_{0.4}O_{1.6}$ alloy over a non-magnetic substratum of $Ni_{61}Fe_{14}Cr_{25}$ alloy based on the revolving deposition as described above. The non-magnetic substratum was formed on a Ti film of 5.0 nm thickness extending over the surface of a wafer made of glass. The thickness of the non-magnetic substratum was set at 2.0 nm. A sintered mass of the mixture of $Fe_{70}Co_{30}$ powder and $Al_2O_3$ powder was used as the target of sputtering for depositing the ferromagnetic layer. The content of the $Al_2O_3$ powder was set in a range between 0.1–3.0 at % in the target. Sputtering was conducted under the atmosphere of Ar gas. The pressure within the chamber was set in a range between 0.1–1.0[Pa]. The applied electric power density was set in a range between $1.0 \times 10^{-4}$–$10.0 \times 10^{-4}$ [W/m$^2$]. The wafer was spaced from the target by the distance of 90–180 mm. The ferromagnetic layer of 300 nm thickness was formed over the non-magnetic substratum. The wafer was kept cooled by water during the sputtering. The BH curve has been derived for the ferromagnetic layer of the FeCoAlO alloy laid over the non-magnetic substratum of the NiFeCr alloy. As is apparent from FIG. 11, the uniaxial magnetic anisotropy is surely established in the ferromagnetic layer of the FeCoAlO alloy.

Figure 12:
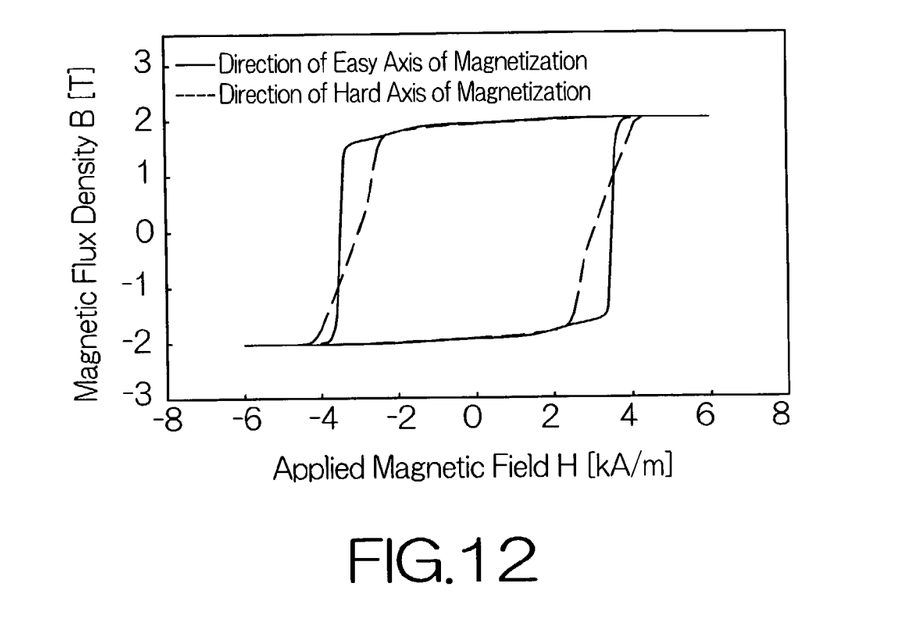
FIG. 12 is a graph illustrating the BH hysteresis of a ferromagnetic layer of FeCoAlO alloy according to a first comparative example.
Figure 13:
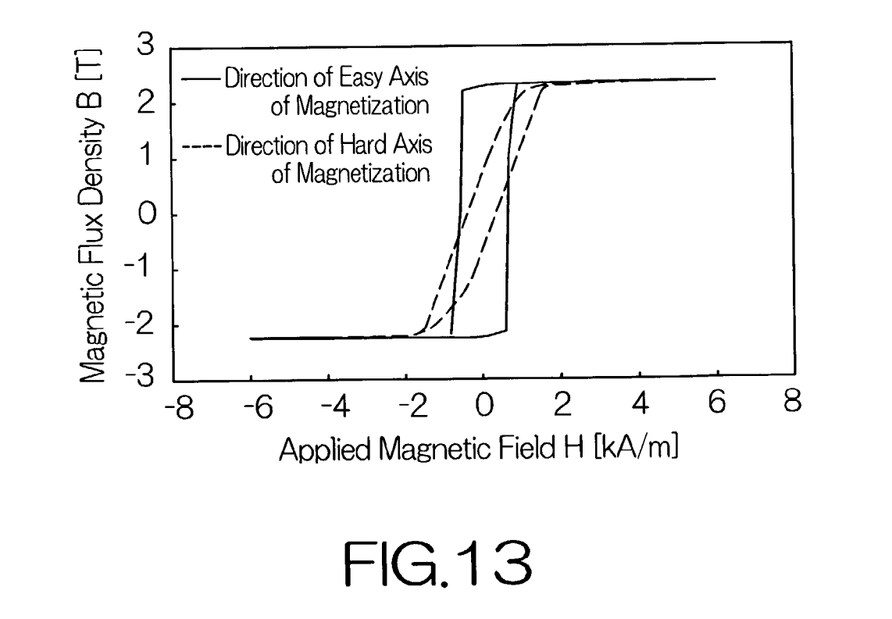
FIG. 13 is a graph illustrating the BH hysteresis of a ferromagnetic layer of FeCoAlO alloy according to a second comparative example.

The inventors have prepared two comparative examples of a ferromagnetic layer. The first comparative example included the ferromagnetic layer of the FeCoAlO, having the thickness of 300 nm, directly laid over the Ti film of 5.0 nm thickness. The second comparative example included the ferromagnetic layer of the FeCoAlO alloy, having the thickness of 300 nm, laid over a ferromagnetic substratum of $Ni_{80}Fe_{20}$ alloy of 2.0 nm thickness formed over the Ti film of 5.0 nm thickness. As is apparent from FIG. 12, the magnetic isotropy was observed in the ferromagnetic layer of the first comparative example. It has been demonstrated that the non-magnetic substratum of the NiFeCr alloy serves to establish the uniaxial magnetic anisotropy in the ferromagnetic layer of the FeCoAlO alloy. On the other hand, the uniaxial magnetic anisotropy was observed in the ferromagnetic layer of the second comparative example as is apparent from FIG. 13. It has accordingly been demonstrated that even the non-magnetic substratum of the NiFe alloy serves to establish the uniaxial magnetic anisotropy in the ferromagnetic layer of the FeCoAlO alloy in accordance with the present invention in the same manner as the ferromagnetic substratum of the NiFe alloy. The establishment of the magnetic anisotropy in the ferromagnetic layer of the FeCoAlO alloy on the ferromagnetic substratum of the NiFe alloy is mentioned in IEEE Transactions on Magnetics, Vol. 36, No. 5, September 2000, pp2506–2508.

Figure 14:
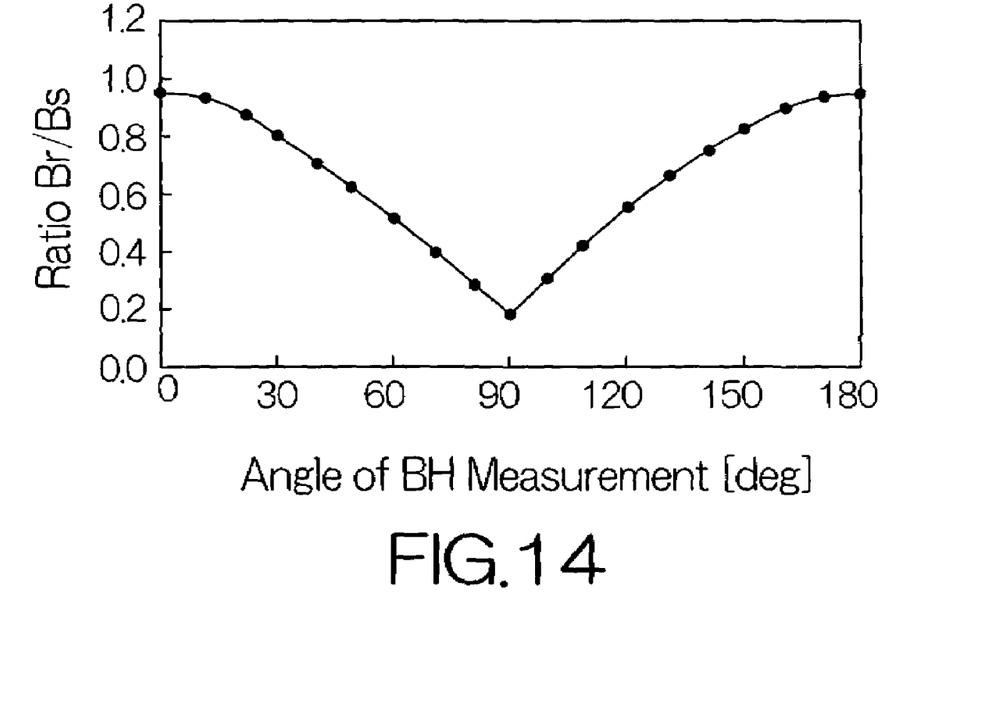
FIG. 14 is a graph illustrating the relationship between the ratio of the residual magnetic flux density to the saturation magnetic flux density and the angle of the BH measurement in the deposited ferromagnetic layer of the FeCoAlO alloy.
Figure 15:
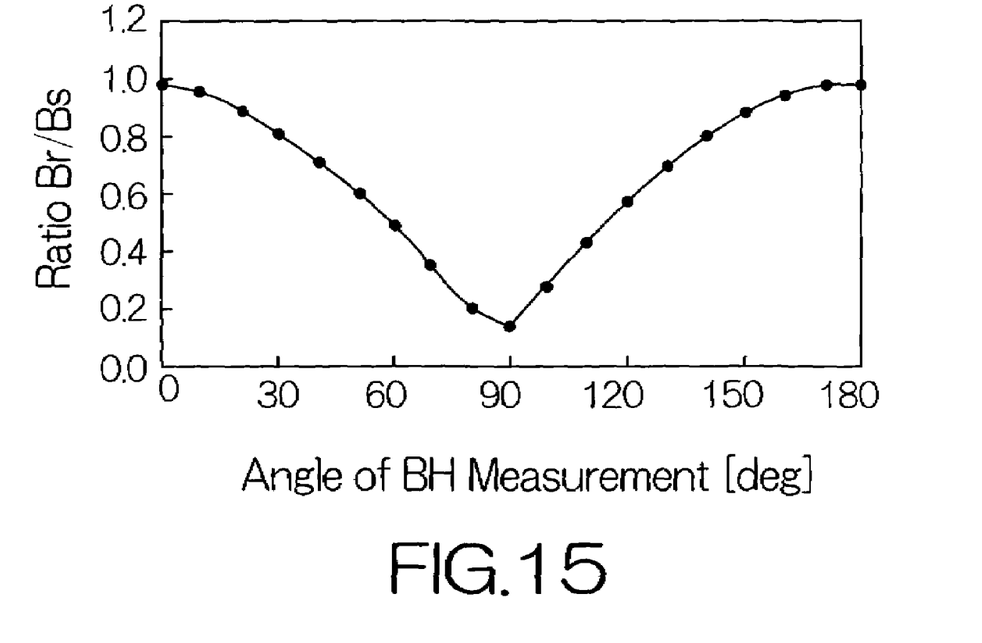
FIG. 15 is a graph illustrating the relationship between the ratio of the residual magnetic flux density to the saturation magnetic flux density and the angle of the BH measurement in the ferromagnetic layer of the FeCoAlO alloy after application of a linear magnetic field under a high temperature condition.

Next, the inventors have measured the saturation magnetic flux density $\underline{Bs}$ and the residual magnetic flux density $\underline{Br}$ for the ferromagnetic layer of the FeCoAlO alloy on the non-magnetic layer of the NiFeCr alloy. During the measurement, the inventors have changed the angle of the BH measurement. As is apparent from FIG. 14, the ratio of the saturation magnetic flux density $\underline{Bs}$ to the residual magnetic flux density $\underline{Br}$, namely, the maximum value of Bs/Br was obtained in the direction of the easy axis of magnetization. In addition, the minimum value of Bs/Br was obtained in the direction of the hard axis of magnetization. Thereafter, the inventors have applied a linear magnetic field to the ferromagnetic layer of the FeCoAlO alloy in the direction perpendicular to the easy axis of magnetization of the ferromagnetic layer of the FeCoAlO alloy. The intensity of the linear magnetic field was set at 240 [kA/m]. The ferromagnetic layer of the FeCoAlO alloy was placed under the high temperature condition of 280 degrees Celsius during the application of the linear magnetic field. The application of the linear magnetic field was maintained for three (3) hours. After the application of the linear magnetic field, the inventors measured the saturation magnetic flux density $\underline{Bs}$ and the residual magnetic flux density $\underline{Br}$ for the ferromagnetic layer of the FeCoAlO alloy on the non-magnetic layer of the NiFeCr alloy. As shown in FIG. 15, no change could be observed in the uniaxial magnetic anisotropy. It has been demonstrated that the aforementioned revolving deposition surely contributes to establishment of the uniaxial magnetic anisotropy in the ferromagnetic layer of the FeCoAlO alloy without the application of the linear magnetic field under the high temperature condition.

Figure 16:
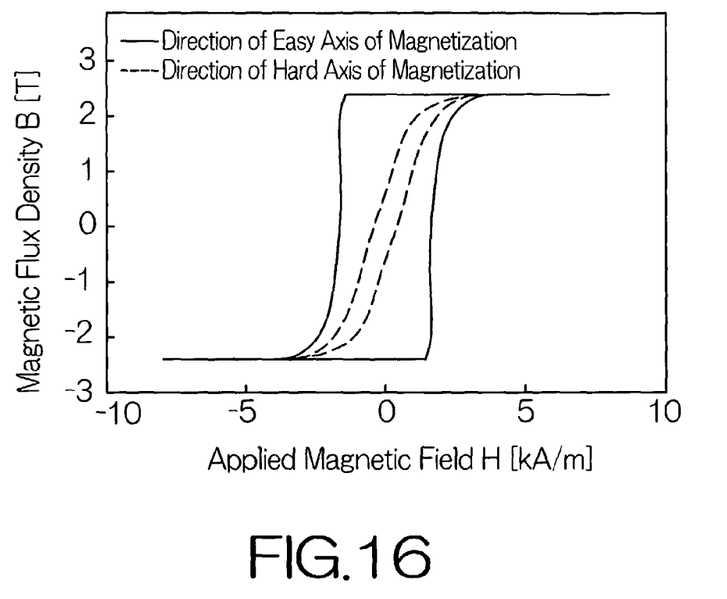
FIG. 16 is a graph illustrating the BH hysteresis of a ferromagnetic layer of FeCo alloy or soft magnetic layer according to the present invention.

Furthermore, the inventors have formed a ferromagnetic layer of $Fe_{65}Co_{35}$ alloy on the non-magnetic substratum of the $Ni_{61}Fe_{14}Cr_{25}$ alloy based on the revolving deposition in the manner as described above. The thickness of the ferromagnetic layer of the $Fe_{65}Co_{35}$ alloy was set at 300 nm. The inventors have observed the BH curve for the ferromagnetic layer of the FeCo alloy on the non-magnetic substratum of the NiFeCr alloy. As shown in FIG. 16, the uniaxial magnetic anisotropy was observed in the ferromagnetic layer of the FeCo alloy. A higher saturation magnetic flux density such as 2.45[T] was maintained in the ferromagnetic layer of the FeCo alloy.

Figure 17:
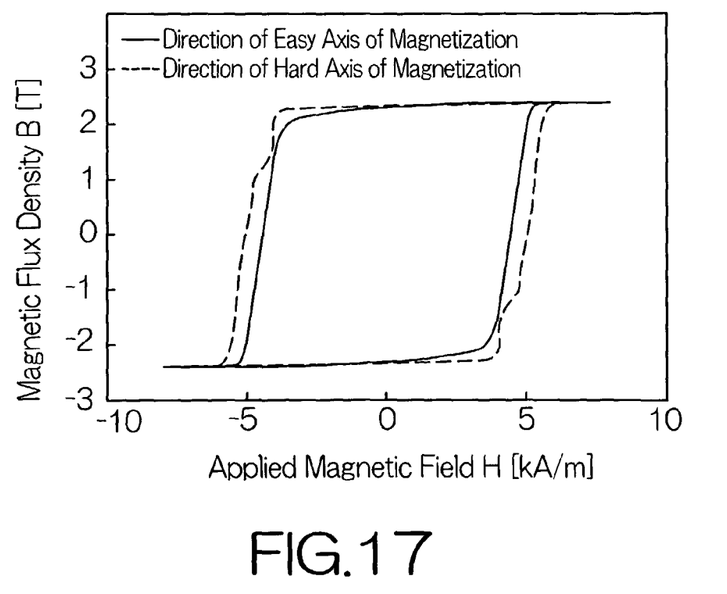
FIG. 17 is a graph illustrating the BH hysteresis of a ferromagnetic layer of FeCo alloy according to a comparative example.

In this case, the inventors prepared a ferromagnetic layer of a comparative example. The ferromagnetic layer of the FeCo alloy having 300 nm thickness was formed directly on the Ti film of the 5.0 nm thickness. As shown in FIG. 17, the magnetic isotropy was observed in the ferromagnetic layer of the comparative example. It has been demonstrated that the non-magnetic substratum of the NiFeCr layer surely contributes to establishment of the uniaxial magnetic anisotropy in the ferromagnetic layer of the FeCo alloy. It should be noted that the uniaxial magnetic anisotropy can be established in the ferromagnetic layer of the FeCo alloy on the non-magnetic layer of the NiFeCr alloy with or without the Ti film.

What is claimed is:

1. A thin film magnetic head comprising:
   a lower magnetic pole;
   a non-magnetic layer laid over the lower magnetic pole;
   a non-magnetic substratum laid over the non-magnetic layer and containing nickel iron alloy; and
   an upper magnetic pole laid over the non-magnetic substratum and containing ferromagnetic atoms.

2. The thin film magnetic head according to claim 1, wherein said non-magnetic substratum further contains at least an atom belonging to an element selected from a group consisting of Al, Y, Ti, Zr, Hf, V, Nb, Ta, Cr, Mo, W, Rh, Ru, Pd and Pt.

3. The thin film magnetic head according to claim 2, wherein said non-magnetic substratum contains Cr at a content equal to or larger than 25 at %.

4. The thin film magnetic head according to claim 1, wherein said upper magnetic pole is made of alloy containing an atom belonging to at least an element selected from a group consisting of Fe and Co.

5. The thin film magnetic head according to claim 4, wherein said upper magnetic pole is made of iron cobalt alloy.

6. The thin film magnetic head according to claim 5, wherein said iron cobalt alloy contains at least an atom belonging to an element selected from a group consisting of O, N and C.

7. The thin film magnetic head according to claim 6, wherein said iron cobalt alloy further contains at least an atom belonging to an element selected from a group consisting of Al, B, Ga, Si, Ge, Y, Ti, Zr, Hf V, Nb, Ta, Cr, Ni, Mo, W, Rh, Ru, Pd and Pt.

8. The thin film magnetic head according to claim 5, wherein said iron cobalt alloy further contains at least an atom belonging to an element selected from a group consisting of Al, B, Ga, Si, Ge, Y, Ti, Zr, Hf, V, Nb, Ta, Cr, Ni, Mo, W, Rh, Ru, Pd and Pt.

9. The thin film magnetic head according to claim 1, wherein said non-magnetic substratum further includes Co.

* * * * *